United States Patent [19]
Nakamura

[11] Patent Number: 4,805,871
[45] Date of Patent: Feb. 21, 1989

[54] ELECTROMAGNETIC VALVE

[75] Inventor: Mamoru Nakamura, Kariya, Japan

[73] Assignee: Aisin Seiki Kabushiki Kaisha, Japan

[21] Appl. No.: 91,023

[22] Filed: Aug. 31, 1987

[30] Foreign Application Priority Data

Sep. 26, 1986 [JP] Japan .................. 61-147991[U]

[51] Int. Cl.$^4$ ............................................ F16K 31/06
[52] U.S. Cl. ............................ 251/129.17; 251/129.15
[58] Field of Search ..................... 251/129.16, 129.17

[56] References Cited
U.S. PATENT DOCUMENTS 2,938,703  5/1960  Dietz ............................. 251/129.16
3,485,270 12/1969  Freeman ...................... 251/129.16 X
4,258,749  3/1981  Mayer .......................... 251/129.16 X
4,390,130  6/1983  Linssen et al. ............... 251/129.16 X

FOREIGN PATENT DOCUMENTS 1031072  5/1982  Fed. Rep. of Germany .
  19504  8/1982  Japan .

Primary Examiner—Arnold Rosenthal
Attorney, Agent, or Firm—Finnegan, Henderson, Farabow, Garrett & Dunner

[57] ABSTRACT

An electromagnetic valve, comprises a casing for defining a flow passage therein; a valve member mounted in the casing for bi-directional movement between two positions for opening and closing the flow passage; an electromagnetic mechanism for moving the valve member in one of the two directions, including a core for magnetically attracting the valve member; a support for supporting the valve member in the casing and for moving the valve member in the other direction; and at least one resilient projection for limiting the movement of the valve member in the one direction for maintaining a separation between the valve member and the core.

6 Claims, 4 Drawing Sheets

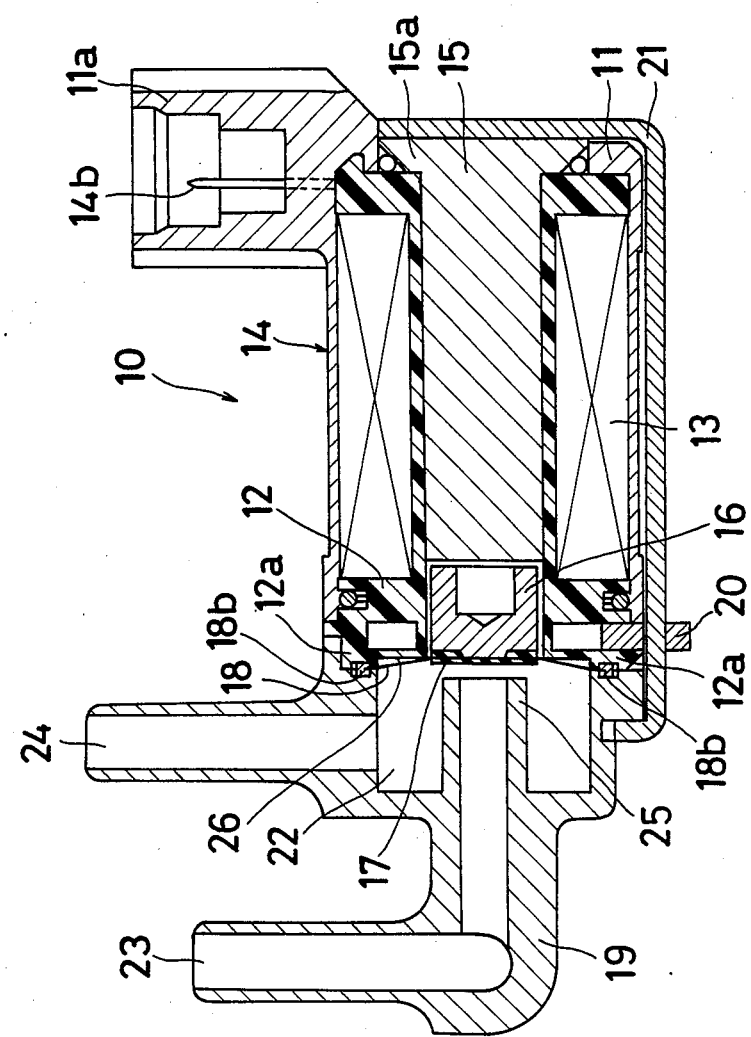

ELECTROMAGNETIC VALVE

BACKGROUND OF THE INVENTION

1. Field of the Invention

This invention relates to an electromagnetic valve and, more particularly, relates to an improved electromagnetic valve wherein a valve member is supported by an elastic supporting member.

2. Description of the Prior Art

In one type of conventional electromagnetic valve, the valve member is supported by an elastic supporting member. Such a conventional valve typically includes a casing with a flow passage therein, a core exposed to a solenoid coil and a plunger which is movable within the casing. The valve member is attracted to the plunger. When the plunger and the valve member are attracted to the core, which is inserted in the solenoid coil, the valve member opens or closes the flow passage. Such a typical electromagnetic valve is disclosed in Japanese Utility Model Patent Publication No. 19504/1982 published on Apr. 23, 1982.

However, in such a conventional electromagnetic valve, the plunger collides with the core when the plunger is attracted to the core. This collision between the plunger and the core results in a loud noise during operation of the valve, and the frequent impact between the plunger and the core may deform the plunger, valve member or the core causing failure of the valve or deterioration of valve operation. Thus, the conventional electromagnetic valve of this type is not desirable for high speed switching use, such as duty ratio control.

SUMMARY OF THE INVENTION

Accordingly, one of the objects of this invention is to provide an improved electromagnetic valve which obviates the above conventional drawbacks.

It is also an object of this invention to prevent collision between the plunger and the core in an electromagnetic valve.

Further, it is an object of this invention to increase the useful life of an electromagnetic valve.

Furthermore, it is an object of this invention to improve the response of an electromagnetic valve.

Yet a further object of this invention is to reduce the noise generated by the operation of an electromagnetic valve.

Additional objects and advantages of the invention will be set forth in part in the description which follows, and in part will be obvious from the description, or may be learned by practice of the invention. The objects and advantages of the invention may be realized and attained by means of the instrumentalities and combinations particularly pointed out in the appended claims.

To achieve the above objects, and in accordance with the principles of the invention as embodied and broadly described herein, the electromagnetic valve of this invention comprises casing means for defining a flow passage therein; a valve member mounted in the casing means for bi-directional movement in two directions for opening and closing the flow passage; electromagnetic means for moving the valve member in one of the two directions, including a core for magnetically attracting the valve member; a resilient support attached to and supporting the valve member in the casing means and for moving the valve member in the other direction; means for limiting the movement of the valve member in the one direction for maintaining a separation between the valve member and the core, said limiting means including at least one resilient projection on the support; and said casing means including a guide surface interacting with the resilient projection for limiting movement of the valve member in the one direction, said guide surface being inclined with respect to the direction of movement of the valve member in the one direction.

The invention also includes a method for reducing noise in an electromagnetic valve, comprising the steps of supporting a valve member for bi-directional movement in two directions in a valve casing for opening and closing a flow passage; electromagnetically attracting the valve member for movement by electromagnetic means in one direction within the casing; and limiting the movement of the valve member in the one direction under the electromagnetic attraction to prevent contact by the valve member within the casing during movement in the one direction thereby maintaining a separation between the valve member and the electromagnetic means.

BRIEF DESCRIPTION OF THE DRAWINGS

The accompanying drawings, which are incorporated in and constitute a part of the specification, illustrate an embodiment of the invention, and, together with the description, serve to explain the principles of the invention. Of the drawings:

FIG. 3 is a cross sectional view of the electromagnetic valve of the present invention with the solenoid energized.

DETAILED DESCRIPTION OF THE PREFERRED EMBODIMENT

Reference will now be made in detail to the present preferred embodiment of the invention, an example of which is illustrated in the accompanying drawings. In accordance with the invention, casing means are provided for defining a flow passage therein. A valve member is mounted in the casing for bi-directional movement between two positions for opening and closing the flow passage. Electromagnetic means move the valve member in one of the two directions, and include a core for magnetically attracting the valve member.

Support means support the valve member in the casing means, and move the valve member in the other direction. The invention also includes means for limiting the movement of the valve member in the one direction for maintaining a separation between the valve member and the core.

Figure 1:
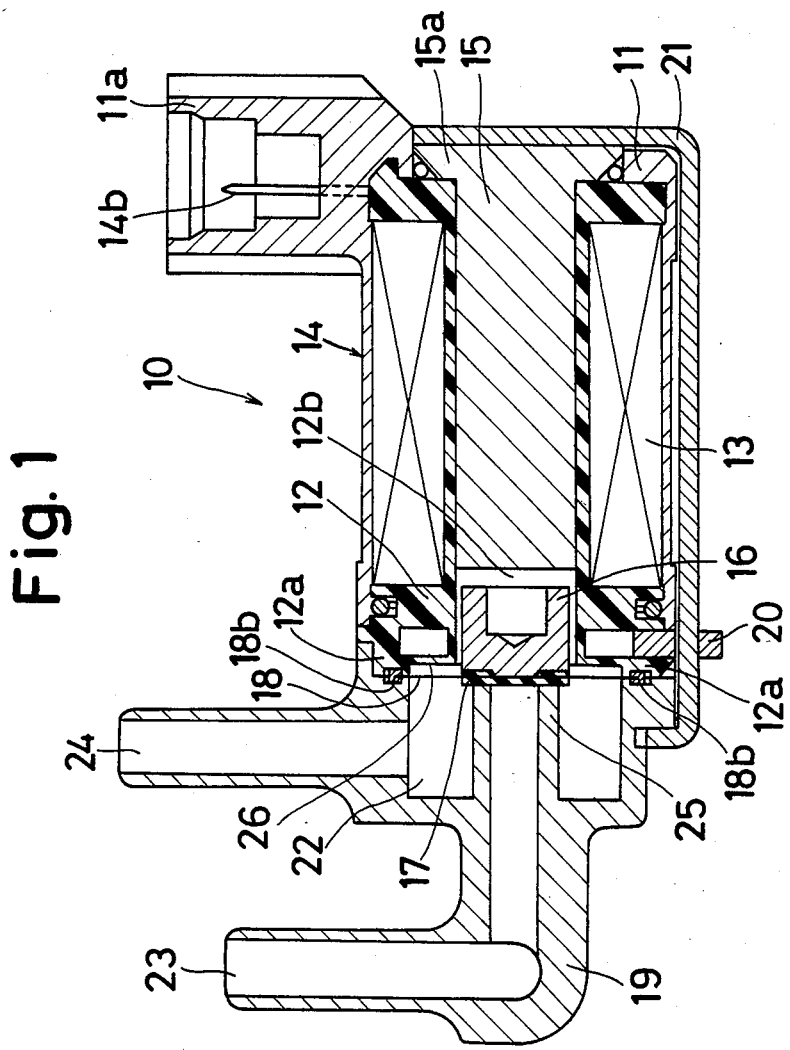
FIG. 1 is a cross sectional view of the electromagnetic valve of the present invention in the stable state.
Figure 2:
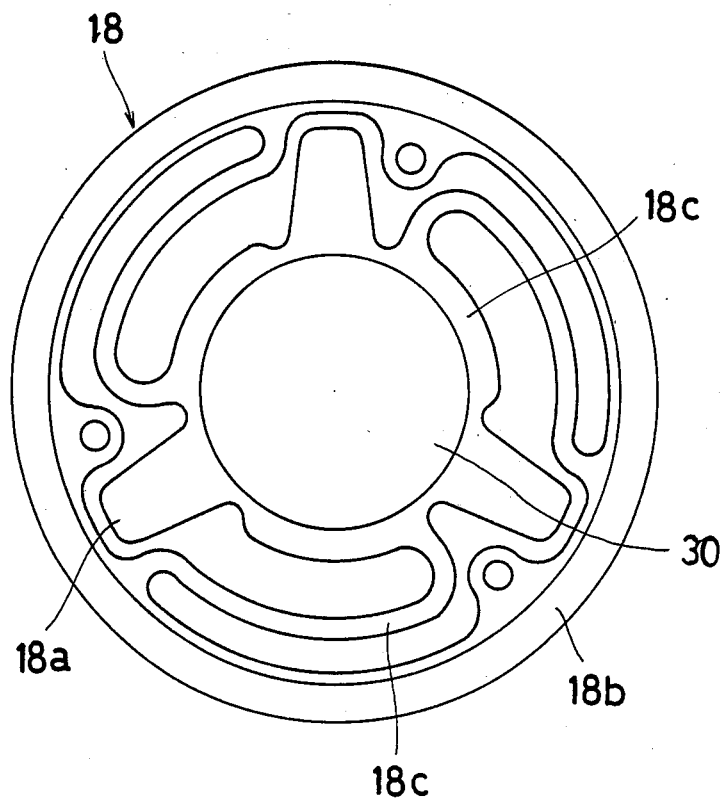
FIG. 2 is a plan view of the elastic supporting member of the present invention.
Figure 4A:
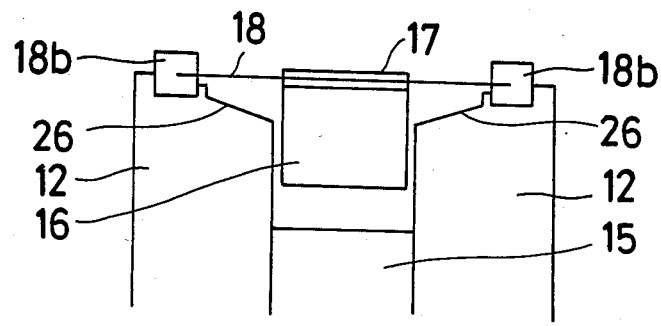
FIGS. 4A to 4D are partial cross sectional views of the electromagnetic valve of the present invention showing the movement of the plunger.
Figure 4B:
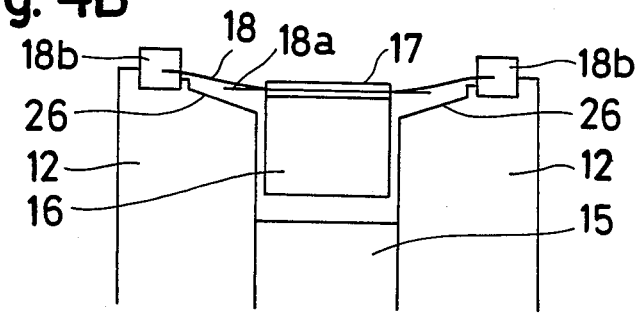
Figure 4C:
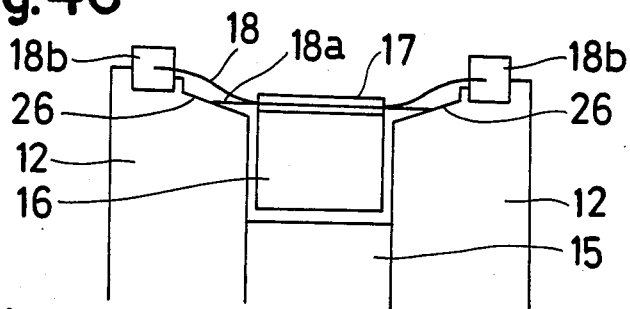
Figure 4D:
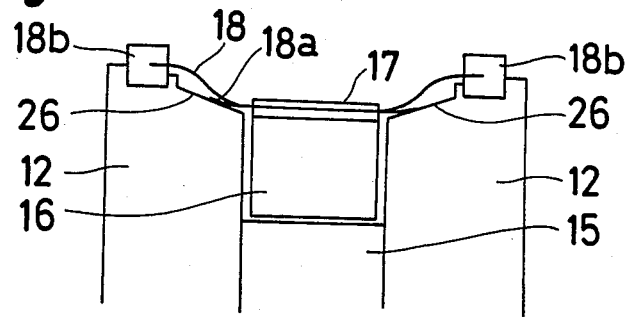

In the illustrated embodiment of the electromagnetic valve 10 shown in the drawings, in FIGS. 1 and 2, the casing means include a casing 11, a body 19 and a yoke 21. The electromagnetic means include a solenoid coil 14 which comprises an electric coil 13 and a bobbin 12. The core includes a core 15 and a side yoke 20. The support means includes a plate spring 18. The valve member includes a plunger 16 and a valve seal 17. The casing means also includes a guide surface 26. The limiting means includes three tongues 18a.

The solenoid coil 14 is fixed to the inside of the casing 11. The solenoid coil consists of the electric coil 13 wound around the bobbin 12. The casing 11 has a connector 11a for connecting the electric coil 13 with a power supply (not shown). The connector 11a is integrally formed with the casing 11. A terminal 14b is disposed on the connector 11a and is electrically connected with the electric coil 13.

The core 15 is tightly inserted into an axial bore 12b of the bobbin 12. One end of the core 15 includes a guard part 15a and the core 15 is inserted to a position where the guard part 15a contacts the bobbin 12.

The plunger 16 is movably disposed in the axial bore 12b of the bobbin 12. One end of the plunger 16 faces the core 15 with a small gap therebetween. The resilient valve seal 17 is fixed to the plunger 16 by heating. The valve seal 17 is mounted at its circumference to the plate spring 18.

A rubber ring 18b is fixed to the circumference of the plate spring 18. The rubber ring 18b is pinched between a projection part 12a of the bobbin 12 and the body 19. Thus, the plate spring 18 is fixed to the bobbin 12.

The projection part 12a is integrally formed at one end of the bobbin 12. At the other end of the bobbin 12, the guide surface 26 is integrally formed, and faces the plate spring 18. The guide surface 26 has an inclination toward the axis of the bobbin 12. Furthermore, at the other end of the bobbin 12, the body 19 is arranged to pinch the plate spring 18 between the body 19 and bobbin 12. The side yoke 20 is also disposed at the end of the bobbin 12. The side yoke 20 supports the yoke 21, which contacts the core 15 and casing 11. One end of the yoke 21 is vented to the body 19 in order to couple the body 19 with the casing 11.

A flow passage 22 is formed in the body 19. The flow passage 22 communicates into the ports 23 and 24. In this embodiment, the port 23 is connected to the lower pressure side, and the port 24 is connected to the higher pressure side. The valve seat 25 is integrally formed with the port 23. The valve seat 25 faces the valve seal 17.

Referring now to FIG. 2, an opening 30 is formed at the center of the plate spring 18. The valve seal 17 (FIG. 1) is inserted into the opening 30. Three tongues 18a which project in the radial direction of the plate spring 18 are formed at the circumference of the opening 30. The rubber ring 18b is attached to the circumference of the plate spring 18 by heating. The central part of the plate spring 18, where the valve seal 17 is fixed, is connected by three bridge pieces 18c to the circumferential part, where the rubber ring 18b is fixed. The plate spring 18 with the tongues 18a and bridge pieces 18c preferably is a punched metal plate.

As shown in FIG. 1, when the electric coil 13 is not energized, the valve seat 17 contacts the valve seat 25 by the offset force of the plate spring 18 and this closes the port 23.

As shown in FIG. 3, when the electric coil 13 is energized, the plunger 16, to which the valve seal 17 is fixed, is attracted to the core 15 by the electromagnetic force. When the plunger 16 is attracted to the core 15, the valve seal 17 is separated from the valve seat 25, and the port 23 connects with the port 24 through the flow passage 22.

At this time, the plate spring 18, which is disposed between valve seal 17 and the projection 12a of the bobbin 12, is deformed by the movement of the plunger 16. Because of the movement of the plunger 16, the tongues 18a also move toward the core 15. The tongues 18a come into contact with the guide surface 26. As shown in FIG. 4, the repulsing force of the tongues 18a prevents the plunger 16 from colliding with the core 15. In this embodiment, the more the plunger 16 is attracted to the core 15, the larger the repulsing force of the tongues 18a becomes. This is because the guide 26 has an inclination toward the axis of the bobbin 12, and the contacting point between the tongues 18a and guide surface 26 moves toward the axis of the bobbin 12. Therefore, collision between the plunger 16 and the core 15 is avoided, thereby reducing the noise previously caused by such repeated contact.

Furthermore, the resilient valve seal 17 is mounted on the plate spring 18 in this embodiment. Therefore, the vibration of the plate spring 18 is absorbed by the valve seal 17. The rubber ring 18b is disposed between the plate spring 18 and bobbin 12. Therefore, any remaining vibration of the plate spring 18 substantially dissipates, and is not transmitted to the bobbin 12. Consequently, the noise generated by the operation of the electromagnetic valve of the prior art is substantially reduced.

Various modifications may be made in the invention without departing from the scope or spirit of the invention.

What is claimed is:

1. An electromagnetic valve comprising:
   casing means for defining a flow passage therein;
   a valve member, including a plunger and a seal for a valve seat, mounted in the casing means for bi-directional movement in two directions for opening and closing the flow passage;
   electromagnetic means for moving the valve member in one of the two directions, including a core for magnetically attracting the valve member;
   a support including a resilient metal disc for supporting the valve member in the casing means, said metal disc moving the valve member in the other direction, said plunger and seal being attached to the metal disc on opposite sides thereof;
   means for limiting the movement of the valve member in the one direction for maintaining a separation between the valve member and the core, said limiting means including at least one resilient projection on the metal disc; and
   said casing means including a guide surface interacting with the resilient projection for limiting movement of the valve member in the one direction, said guide surface being inclined with respect to the direction of movement of the valve member in the one direction.

2. The valve of claim 1 wherein the metal disc includes a series of cut out portions for increasing the resiliency of the disc.

3. An electromagnetic valve comprising:
   casing means for defining a flow passage therein;
   a valve member mounted in the casing means for bi-directional movement in two directions for opening and closing the flow passage;
   electromagnetic means for moving the valve member in one of the two directions, including a core for magnetically attracting the valve member;
   a resilient support attached to and supporting the valve member in the casing means and for moving the valve member in the other direction;
   means for limiting the movement of the valve member in the one direction for maintaining a separation between the valve member and the core, said limiting means including at least one resilient projection on the support; and said casing means including a guide surface interacting with the resilient projection for limiting movement of the valve member in the one direction, said guide surface being inclined with respect to the direction of movement of the valve member in the one direction.

4. The valve of claim 3 wherein said resilient support is a deformable plate spring mounted within the casing means and on which the valve seat is mounted.

5. The valve of claim 4 wherein said at least one resilient projection is formed as a part of said plate spring and makes moving contact with said guide surface in response to movement of said valve member.

6. The valve of claim 4 wherein said at least one resilient projection includes three resilient projections.

* * * * *